United States Patent [19]

Shigeta

[11] Patent Number: 5,692,448

[45] Date of Patent: Dec. 2, 1997

[54] APPARATUS AND METHOD FOR CREATING AND MODIFYING STITCHING DATA USED BY A SEWING MACHINE

[75] Inventor: Katsunori Shigeta, Aichi, Japan

[73] Assignee: Mitsubishi Denki Kabushiki Kaisha, Tokyo, Japan

[21] Appl. No.: 528,222

[22] Filed: Sep. 14, 1995

[30] Foreign Application Priority Data

Feb. 23, 1995 [JP] Japan .............................. HEI 7-035468

[51] Int. Cl.⁶ .................................................. D05C 5/02
[52] U.S. Cl. ................. 112/102.5; 112/458; 112/475.05; 112/475.19
[58] Field of Search .......................... 112/475.05, 475.19, 112/102.5, 470.04, 470.06, 456, 458; 364/470

[56] References Cited

U.S. PATENT DOCUMENTS

| | | | |
|---|---|---|---|
| 4,582,006 | 4/1986 | Yamane | 112/470.06 X |
| 4,665,847 | 5/1987 | Takano et al. | 112/102.5 |
| 5,239,475 | 8/1993 | Shigeta et al. | 112/458 X |

FOREIGN PATENT DOCUMENTS 61-31377  2/1986  Japan .

Primary Examiner—Peter Nerbun
Attorney, Agent, or Firm—Sughrue, Mion, Zinn, Macpeak & Seas, PLLC

[57] ABSTRACT

A method and apparatus, for use with a sewing machine, for modifying stitching data representing a pattern that the sewing machine is to sew. The stitching data includes non-stitching feed data, in accordance with which the sewing machine feeds a needle without sewing from an origin position to a sewing start position, and seam data including information defining feeding directions and feed amounts per stitch, in accordance with which the sewing machine sews the pattern. A data identifying device identifies the seam data of the stitching data. A seam data changing device converts, in accordance with an enlargement/reduction ratio stored in a storage device of the sewing machine, the seam data identified by the data identifying device into new seam data representing a new pattern which is an enlarged version of the original pattern enlarged or reduced relative to the sewing start position, without modifying the non-stitching feed data. A non-stitching feed data creating device creates new non-stitching feed data. Also, a center determining or calculating device determines or calculates the center of the new pattern, so that the seam data changing device converts the seam data with reference to this center.

16 Claims, 18 Drawing Sheets

FIG. 3(a)

| ADDRESS | | |
|---|---|---|
| 0000 | CONTROL COMMAND | 1TH STITCH |
| 0001 | X-AXIS FEED AMOUNT | NON-STITCHING FEED |
| 0002 | Y-AXIS FEED AMOUNT | |
| 0003 | CONTROL COMMAND | 2TH STITCH |
| 0004 | X-AXIS FEED AMOUNT | NON-STITCHING FEED |
| 0005 | Y-AXIS FEED AMOUNT | |
| ↓ | | |
| 3(N-1) | CONTROL COMMAND | NTH STITCH |
| 3(N-1)+1 | X-AXIS FEED AMOUNT | SEWING START POSITION |
| 3(N-1)+2 | Y-AXIS FEED AMOUNT | |
| 3N | CONTROL COMMAND | N+1TH STITCH |
| 3N+1 | X-AXIS FEED AMOUNT | SEWING DATA |
| 3N+2 | Y-AXIS FEED AMOUNT | |
| 3(N+1) | CONTROL COMMAND | N+2TH STITCH |
| 3(N+1)+1 | X-AXIS FEED AMOUNT | SEWING DATA |
| 3(N+1)+2 | Y-AXIS FEED AMOUNT | |
| ↓ | | |
| | CONTROL COMMAND | |
| | X-AXIS FEED AMOUNT | |
| | Y-AXIS FEED AMOUNT | |
| | | END DATA |

FIG. 3(b)

| | | |
|---|---|---|
| ⇨ UNCHANGED | CONTROL COMMAND | 1TH STITCH |
| | X-AXIS FEED AMOUNT | NON-STITCHING FEED |
| | Y-AXIS FEED AMOUNT | |
| ⇨ UNCHANGED | CONTROL COMMAND | 2TH STITCH |
| | X-AXIS FEED AMOUNT | NON-STITCHING FEED |
| | Y-AXIS FEED AMOUNT | |
| ↓ | | |
| ⇨ ENLARGED/REDUCED | CONTROL COMMAND | NTH STITCH |
| | X-AXIS FEED AMOUNT | SEWING START POSITION |
| | Y-AXIS FEED AMOUNT | |
| ⇨ ENLARGED/REDUCED | CONTROL COMMAND | N+1TH STITCH |
| | X-AXIS FEED AMOUNT | SEWING DATA |
| | Y-AXIS FEED AMOUNT | |
| ⇨ ENLARGED/REDUCED | CONTROL COMMAND | N+2TH STITCH |
| | X-AXIS FEED AMOUNT | SEWING DATA |
| | Y-AXIS FEED AMOUNT | |
| ↓ | | |
| ⇨ ENLARGED/REDUCED | CONTROL COMMAND | |
| | X-AXIS FEED AMOUNT | |
| | Y-AXIS FEED AMOUNT | |
| | | END DATA |

FIG. 5(a)

| ADDRESS | | |
|---|---|---|
| 0000 | CONTROL COMMAND | 1TH STITCH |
| 0001 | X-AXIS FEED AMOUNT | NON-STITCHING FEED |
| 0002 | Y-AXIS FEED AMOUNT | |
| 0003 | CONTROL COMMAND | 2TH STITCH |
| 0004 | X-AXIS FEED AMOUNT | NON-STITCHING FEED |
| 0005 | Y-AXIS FEED AMOUNT | |
| ↓ | | |
| 3(N-1) | CONTROL COMMAND | NTH STITCH |
| 3(N-1)+1 | X-AXIS FEED AMOUNT | SPECIFIED STITCH POSITION |
| 3(N-1)+2 | Y-AXIS FEED AMOUNT | |
| 3N | CONTROL COMMAND | N+1TH STITCH |
| 3N+1 | X-AXIS FEED AMOUNT | SEWING DATA |
| 3N+2 | Y-AXIS FEED AMOUNT | |
| 3(N+1) | CONTROL COMMAND | N+2TH STITCH |
| 3(N+1)+1 | X-AXIS FEED AMOUNT | SEWING DATA |
| 3(N+1)+2 | Y-AXIS FEED AMOUNT | |
| ↓ | | |
| | CONTROL COMMAND | |
| | X-AXIS FEED AMOUNT | |
| | Y-AXIS FEED AMOUNT | |
| | | END DATA |

FIG. 5(b)

| | | |
|---|---|---|
| ⇒ UNCHANGED | CONTROL COMMAND | 1TH STITCH |
| | X-AXIS FEED AMOUNT | NON-STITCHING FEED |
| | Y-AXIS FEED AMOUNT | |
| ⇒ UNCHANGED | CONTROL COMMAND | 2TH STITCH |
| | X-AXIS FEED AMOUNT | NON-STITCHING FEED |
| | Y-AXIS FEED AMOUNT | |
| ↓ | | |
| ⇒ ENLARGED/ REDUCED | CONTROL COMMAND | NTH STITCH |
| | X-AXIS FEED AMOUNT | SPECIFIED STITCH POSITION |
| | Y-AXIS FEED AMOUNT | |
| ⇒ ENLARGED/ REDUCED | CONTROL COMMAND | N+1TH STITCH |
| | X-AXIS FEED AMOUNT | SEWING DATA |
| | Y-AXIS FEED AMOUNT | |
| ⇒ ENLARGED/ REDUCED | CONTROL COMMAND | N+2TH STITCH |
| | X-AXIS FEED AMOUNT | SEWING DATA |
| | Y-AXIS FEED AMOUNT | |
| ↓ | | |
| ⇒ ENLARGED/ REDUCED | CONTROL COMMAND | |
| | X-AXIS FEED AMOUNT | |
| | Y-AXIS FEED AMOUNT | |
| | | END DATA |

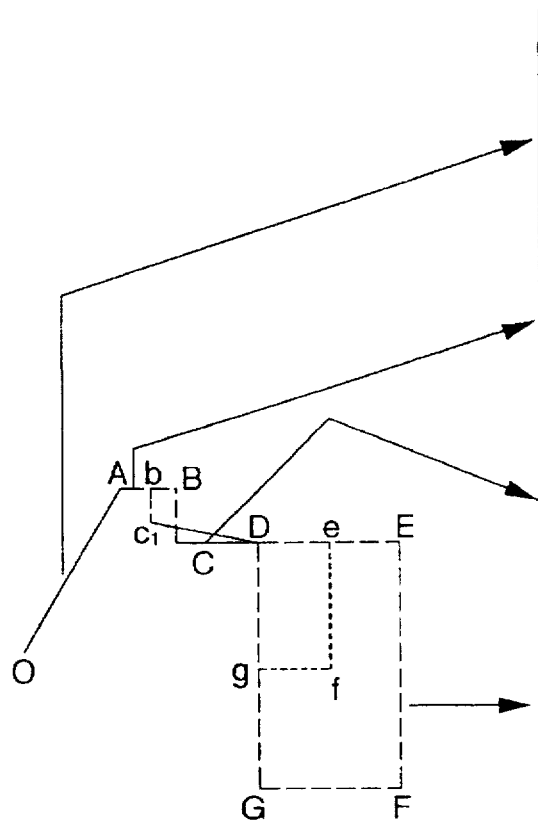

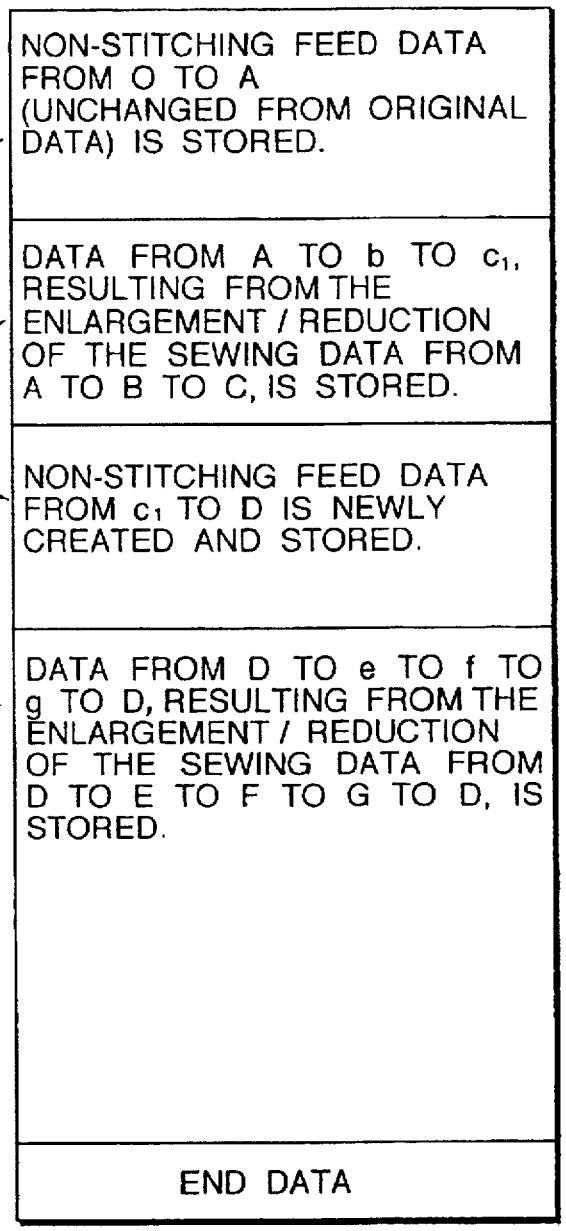

| NON-STITCHING FEED DATA FROM O TO A (UNCHANGED FROM ORIGINAL DATA) IS STORED. |
| --- |
| DATA FROM A TO b TO $c_1$, RESULTING FROM THE ENLARGEMENT / REDUCTION OF THE SEWING DATA FROM A TO B TO C, IS STORED. |
| NON-STITCHING FEED DATA FROM $c_1$ TO D IS NEWLY CREATED AND STORED. |
| DATA FROM D TO e TO f TO g TO D, RESULTING FROM THE ENLARGEMENT / REDUCTION OF THE SEWING DATA FROM D TO E TO F TO G TO D, IS STORED. |
| END DATA |

FIG. 12(a)

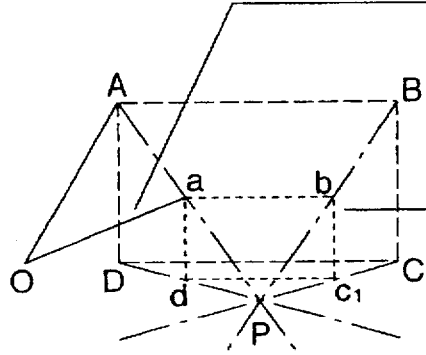

FIG. 12(b)

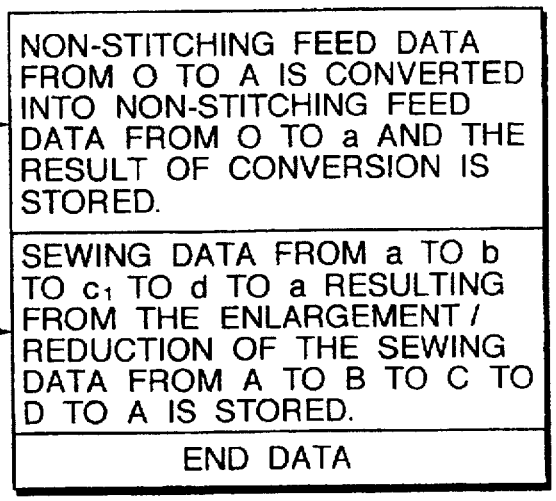

NON-STITCHING FEED DATA FROM O TO A IS CONVERTED INTO NON-STITCHING FEED DATA FROM O TO a AND THE RESULT OF CONVERSION IS STORED.

SEWING DATA FROM a TO b TO $c_1$ TO d TO a RESULTING FROM THE ENLARGEMENT / REDUCTION OF THE SEWING DATA FROM A TO B TO C TO D TO A IS STORED.

END DATA

FIG. 12(c)

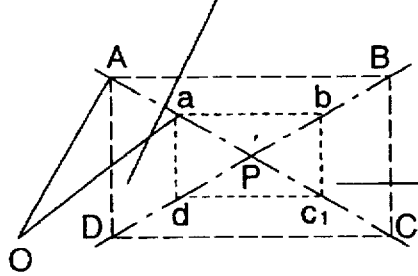

FIG. 12(d)

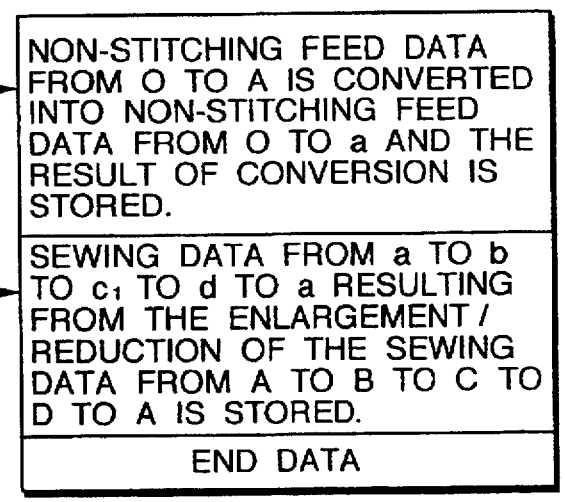

NON-STITCHING FEED DATA FROM O TO A IS CONVERTED INTO NON-STITCHING FEED DATA FROM O TO a AND THE RESULT OF CONVERSION IS STORED.

SEWING DATA FROM a TO b TO $c_1$ TO d TO a RESULTING FROM THE ENLARGEMENT / REDUCTION OF THE SEWING DATA FROM A TO B TO C TO D TO A IS STORED.

END DATA

FIG. 18

| ADDRESS | | |
|---|---|---|
| 0000 | CONTROL COMMAND | 1TH STITCH |
| 0001 | X-AXIS FEED AMOUNT | NON-STITCHING FEED |
| 0002 | Y-AXIS FEED AMOUNT | |
| 0003 | CONTROL COMMAND | 2TH STITCH |
| 0004 | X-AXIS FEED AMOUNT | NON-STITCHING FEED |
| 0005 | Y-AXIS FEED AMOUNT | |
| ↓ | | |
| 3(N-1) | CONTROL COMMAND | NTH STITCH |
| 3(N-1)+1 | X-AXIS FEED AMOUNT | SEWING START |
| 3(N-1)+2 | Y-AXIS FEED AMOUNT | |
| 3N | CONTROL COMMAND | N+1TH STITCH |
| 3N+1 | X-AXIS FEED AMOUNT | SEWING DATA |
| 3N+2 | Y-AXIS FEED AMOUNT | |
| | CONTROL COMMAND | N+2TH STITCH |
| | X-AXIS FEED AMOUNT | SEWING DATA |
| | Y-AXIS FEED AMOUNT | |
| ↓ | | |
| | CONTROL COMMAND | |
| | X-AXIS FEED AMOUNT | |
| | Y-AXIS FEED AMOUNT | |
| | | END DATA |

APPARATUS AND METHOD FOR CREATING AND MODIFYING STITCHING DATA USED BY A SEWING MACHINE

BACKGROUND OF THE INVENTION

1. Field of the Invention

The present invention relates to a method and apparatus, for use with an electronic sewing machine, for creating stitching data representing a pattern to be sewed by the sewing machine, and particularly, to a method and apparatus for efficiently modifying the stitching data to enlarge or reduce the pattern.

2. Description of the Related Art

Industrial sewing machines, which are electronic sewing machines, operate by gripping a cloth or workpiece under pressure, and moving the cloth or workpiece on a given plane in accordance with stitching data (sewing information) which is preprogrammed and retained on a storage medium. Hence, a predetermined pattern can be automatically sewn.

The sewing information is retained on the storage medium in a storage device for easy access to enable the sewing machine to stitch different sewing patterns. The storage medium, which can be, for example, a semiconductor memory, a magnetic card or a floppy disk, retains information used to drive the sewing machine according to a sewing operation sequence.

The stitching data defines the relative positional displacement between a needle of the sewing machine and the cloth or workpiece per each stitch of the sewing machine that forms a sewing pattern. The stitching data further defines the sewing speed, and includes a control command which controls the sewing machine, in particular, a motor which drives the sewing machine. The stitching data of a single sewing pattern is formed as a family of per-stitch data.

In order for the sewing machine to stitch a desired sewing pattern, stitching data associated with the desired sewing pattern must be previously created and stored in the predetermined storage medium, which will be accessed by the sewing machine during the stitching operation. A conventional apparatus for creating and storing stitching data will now be described with reference to FIGS. 13 to 15.

The apparatus comprises a menu section 11, which serves as an enlargement/reduction setting device via which the enlargement/reduction ratio of stitching data is entered, and a tablet digitizer 10 having a pattern input section 13. A mouse 12 is equipped with a data reading portion 12a and a switch 12b to enable a user to make a selection in the menu section 11 or to obtain coordinate data from the pattern input section 13.

A CPU 14 performs arithmetic operations, which will be described later, and controls the sewing machine. A floppy disk drive 18 writes stitching data onto a floppy disk acting as a storage medium or reads stitching data from the floppy disk.

Art LED display panel 20 is made up of various switches and LEDs. System ROM 22 stores a program which operates on the coordinate data entered from the tablet digitizer 10 to convert that coordinate data into stitching data and writes the converted data onto a floppy disk. Main storage RAM 24 stores the stitching data and the enlargement/reduction ratio entered from the enlargement/reduction setting device, and a CRT 26 displays the stitching data.

An I/O controller 44 controls input and output to and from the display panel 20. FDD controller 45 writes onto a floppy disk 42 the data stored in the main storage RAM 24 or reads the data from the floppy disk 42. A CRT controller 46 controls the CRT 26, and a serial controller 48 controls serial communications.

The operation of this stitching data creating apparatus will now be described with reference to FIG. 15. First, a drawing on which a seam pattern (stitching data), such as that shown in FIG. 16(a), has been drawn is placed on the pattern input section 13. According to this stitching data, the fabric or workpiece is fed from origin O to point A without sewing so that the needle is positioned at the sewing start position and a cloth is seamed with the specified seam length from point A to point B, from point B to point C, from point C to point D, and from point D to point A.

The stitching data shown in FIG. 16(a) can also be enlarged to a large quadrangle O-A2-B2-C2-D2-A2 with a seam length of 3 mm as shown in FIG. 16(b), as will now be described. In this case, all the stitching data is enlarged.

The data reading portion 12a of the mouse 12 is placed at origin O in the seam pattern diagram in FIG. 16(a), and switch 12b is pressed to enter the origin position. The keys on the menu section 11 are then pressed in the following sequence to set the enlargement/reduction ratio: "1", "5", "0", "SCALE", "SEAM LENGTH", "3", ".", "00", "HIGH SPEED", "STRAIGHT", "START".

From the mouse 12, the "NON-STITCH FEED" portion is defined by points O and A, and point B, point C, point D, point A, "TRIM" and "END" are entered. This causes the coordinates data to be entered via the serial controller 48 and stored in the main storage RAM 24. In this case, the enlargement ratio is set to 150%. It is to be understood from FIG. 16(b) that for the reduction of 50% (small quadruple), the terms O, A1, B1, C1, D1, A1, "5", "0", "SCALE", . . . are to be entered.

Data processing associated with the input operation will be described with reference to FIGS. 17 and 18. The switch 12b of the mouse 12 is first pressed (step S1). The coordinates data is read (step S2) and stored in the main storage RAM 24 temporarily. It is then determined whether the data read is a selection in the menu section 11 or the coordinates data of the seam pattern (step S3).

If the data read is the coordinates data, the CPU 14 performs calculations on the coordinates data read, according to the enlargement ratio having the X-axis and Y-axis feed amounts set per stitch under the control of the program stored in the system ROM 22 (step S4). The variations of the X and Y coordinate data or seam data resulting from the arithmetic operation of the coordinate data, that is, relative value data, is temporarily stored in the main storage RAM 24.

Subsequently, if the data read is the selection in the menu section 11, it is determined which menu item has been selected (step S5), and processing associated with the menu item selected is performed (step S6). Processing is performed to create stitching data and display it on the LED display panel together with the results of processing performed in step S4 or S6 (step S7).

Processing is carried out to display the created stitching data on the CRT 26 or to write it onto the floppy disk 42 (step S8). Hereafter, every time the switch 12b of the mouse 12 is pressed, the above operation is repeated. The CPU 14 converts the stitching data stored in the main storage RAM 24 into image display data and displays a seam pattern graphic on the CRT 26 via the CRT controller 46.

FIG. 18 shows the stitching data when it has been enlarged or reduced. This stitching data contains the number of seams (stitches) and the non-stitching feed data part has also been enlarged or reduced.

The stitching data consists of a control command and feed amounts as seam data per stitch. The control command is stored in the first byte, the X-axis feed amount of the seam data or non-stitching feed data is stored in the second byte, and the Y-axis feed amount of the seam data or non-stitching feed data is stored in the third byte. A single unit of stitching data from the first stitch to the end data, included as one of the stitch data, is stored at predetermined addresses in the entered sequence.

Through the above operation, the input operation of the seam pattern is finished. Subsequently, the stitching data stored temporarily in the main storage RAM 24 is written onto the floppy disk 42 via the FDD controller 45, and this floppy disk is loaded into a sewing machine control apparatus (not shown) to drive the sewing machine according to the desired pattern.

The non-stitching feed data part is generally used to set the amount of movement of the workpiece so that the position of the needle with respect to the workpiece is moved from the origin. Hence, if the seam data part is enlarged/reduced, it is often unnecessary to change the non-stitching feed data. However, the conventional apparatus for creating stitching data as described above does not allow the non-stitching feed data part to remain unchanged, while only enlarging or reducing the seam data part of the data. Accordingly, in the conventional apparatus, the non-stitching feed data part needs to be recreated, which complicates and slows the data creating process.

In certain circumstances, an input device for a sewing machine disclosed in Japanese Laid-Open Utility Model Publication No. SHO61-31377 could be used to enlarge only the non-stitching feed data, while leaving the seam data part unchanged. However, this input device was merely intended to create stitching data in excess of the graphic creating area of a graphic creating apparatus, and does not solve the problem of allow the non-stitching feed data part to remain unchanged, while only enlarging or reducing the seam data part.

Furthermore, the conventional apparatus is unable to enlarge/reduce only the data after a certain specified seam position without recreating the sewing data. Hence, the conventional apparatus is very limited in its ability to perform seam data modifications.

Other problems and limitations with the conventional apparatus also exist. For example, when single stitching data includes a plurality of sewing start points, the seam data part containing the specified sewing start point could not be enlarged/reduced without the relative positions of the plurality of sewing start points being changed by enlargement/ reduction. Accordingly, the sewing data part would need to be recreated.

Furthermore, enlargement/reduction relative to any position could not be performed without the center of the seam part being moved. That is, because the setting from the mechanical origin of a workpiece and the sewing data are independent from each other, complicated operations are required to correct a slight offset between the origin and sewing data.

SUMMARY OF THE INVENTION

An object of the present invention is to provide an apparatus which efficiently creates stitching data for a sewing machine and allows a non-stitching feed data part of the stitching data to remain unchanged while enlarging or reducing only a seam data part of the stitching data. To achieve this object, the apparatus for creating stitching data comprises a data determining device which identifies the non-stitching feed data part and seam data part of the stitching data. A seam data changing device therefore enlarges/ reduces only the seam data part as identified by the data determining device, relative to a start position in accordance with an enlargement/reduction ratio stored in a storage device. Hence, the non-stitching feed data part is left unchanged and only the seam data part can be enlarged or reduced, thereby improving efficiency.

Another object of the invention is to provide an apparatus which creates stitching data for a sewing machine and allows only the data at and after a specified seam position to be enlarged or reduced. To achieve this object, the apparatus for creating stitching data comprises a seam data specifying device which specifies any data in the seam data part, and a specified data changing device which enlarges/reduces only the seam data part relative to the position of the data specified by the seam data specifying device. Hence, only the data at and after a specified stitch position can be enlarged/reduced, thereby ensuring that the seam data part is modified easily.

A third object of the present invention is to provide an apparatus which creates stitching data for a sewing machine and does not cause the relative positions of sewing start points to be changed due to enlargement/reduction when the stitching data includes a plurality of sewing start points. To achieve this object, the apparatus which creates stitching data comprises a non-stitching feed data creating device which creates non-stitching feed data between a first seam data part and a second seam data part changed according to an enlargement/reduction ratio. Hence, when stitching data includes a plurality of sewing start points, the relative positions of the sewing start points are not changed by enlargement/reduction, thus ensuring that the seam data part is modified easily.

Another object of the present invention is to provide an apparatus which creates stitching data for a sewing machine and allows only a seam data part including a specified sewing start point to be enlarged or reduced without the relative positions of sewing start points being changed by enlargement/reduction when stitching data includes a plurality of sewing start points. To achieve this object, the apparatus for creating the stitching data includes a seam data specifying device which specifies any point in either of the first seam data part or second seam data part. A seam data changing device then enlarges/reduces only said specified seam data part relative to the start position of said seam data according to the enlargement/reduction ratio. Hence, when stitching data includes a plurality of sewing start points, only the seam data part including the specified sewing start point can be enlarged/reduced without the relative positions of the sewing start points being changed by enlargement/reduction, thus ensuring that the seam data part is modified easily.

A fifth object of the present invention is to provide an apparatus which creates stitching data for a sewing machine and allows an offset between a setting from the mechanical origin of a workpiece and sewing data to be corrected easily by enlargement/reduction. To achieve this object, the apparatus which creates the stitching data comprises a center specifying device which specifies the center values of the enlargement/reduction of the seam data part. Thus, the seam data changing device enlarges/reduces, according to the enlargement/reduction ratio, the positions of seam points in the seam data part on the basis of the center values specified by the center specifying device. Therefore, stitching data can be enlarged or reduced relative to the specified center, thereby ensuring that the seam data part is modified easily.

Further with regard to this object, the apparatus for creating the stitching data comprises a center value arithmetic device which operates on the respective center values of the coordinate values of the sum of the X-axis data and Y-axis data relative to a sewing start position. Therefore, the seam data changing device enlarges/reduces the seam data according to the enlargement/reduction ratio on the basis of the center values found by the center value arithmetic device. Accordingly, an offset between a setting from the mechanical origin of a workpiece and sewing data can be corrected easily.

Alternatively, to achieve this object, the apparatus for creating stitching data further comprises a non-stitching feed data creating device which creates non-stitching feed data up to an origin on the basis of the center values. This eliminates the need for re-entry of a non-stitching feed data part when the stitching data is enlarged or reduced.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which:

FIGS. 3(a) and 3(b), respectively, illustrate stitching data for the stitching pattern shown in FIG. 1(a), before and after the enlargement/reduction is performed;

FIGS. 5(a) and 5(b), respectively, illustrate stitching data for the stitching pattern shown in FIG. 1(b), before and after the enlargement/reduction is performed;

FIGS. 7(a) and 7(b), respectively, illustrate associated areas for the stitching pattern shown in FIG. 1(c), before and after the enlargement/reduction is performed;

FIGS. 12(a) and 12(b), respectively, illustrate associated areas for the stitching pattern shown in FIG. 1(e), before and after the enlargement/reduction is performed;

FIGS. 12(c) and 12(d), respectively, illustrate associated areas for the stitching pattern shown in FIG. 1(f), before and after the enlargement/reduction is performed;

FIG. 18 illustrates conventional stitching data.

DETAILED DESCRIPTION OF THE PREFERRED EMBODIMENTS

The subject application incorporates by reference Japanese Patent Application No. 7-35468 in its entirety.

Figure 14:
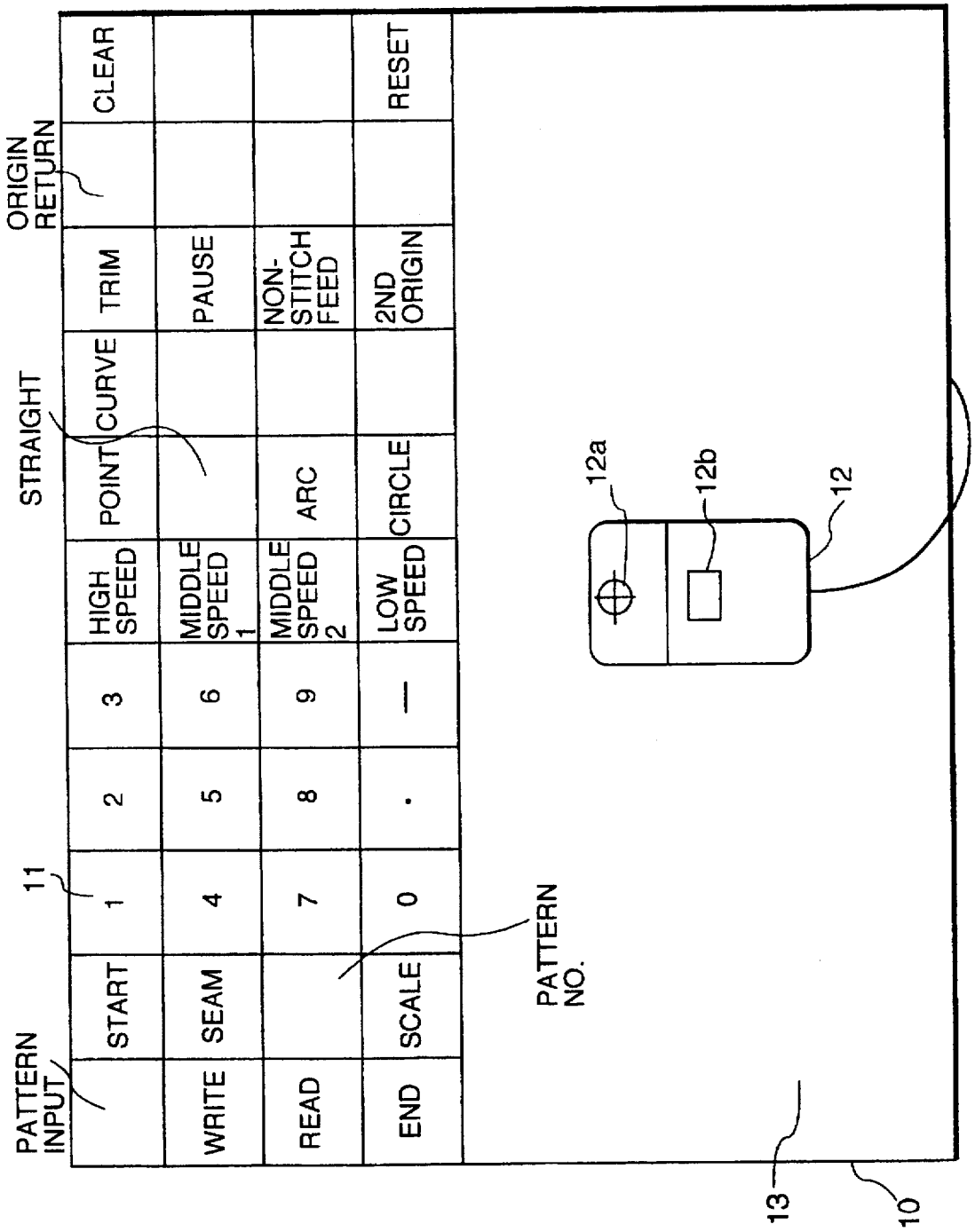
FIG. 14 is a diagram illustrating an example of the input devices for the apparatus shown in FIG. 13.
Figure 15:
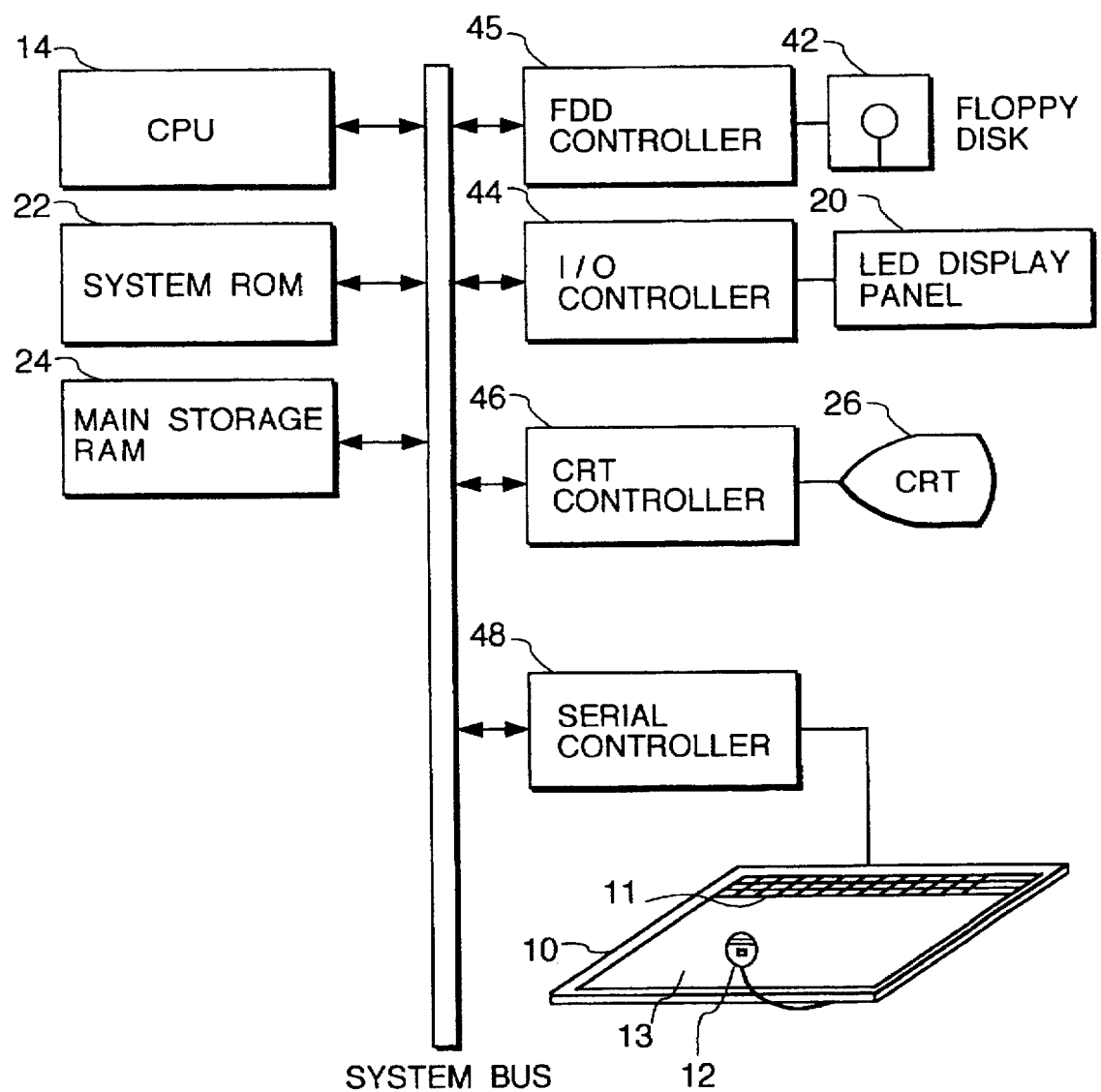
FIG. 15 is a block diagram of an apparatus for creating stitching data for sewing machines.
Figure 16A:
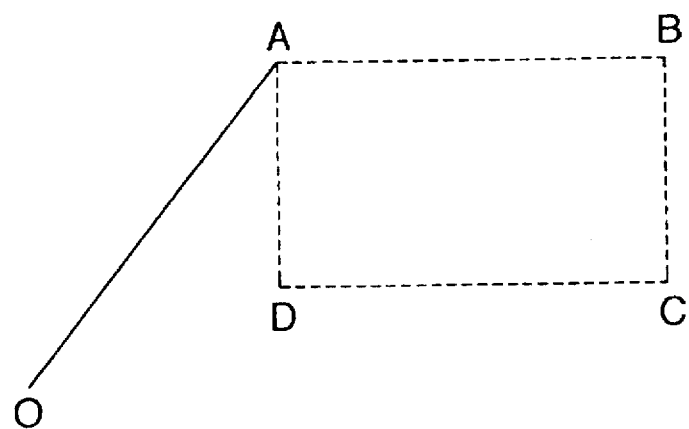
FIGS. 16(a) and 16(b) are examples of a seam pattern which is enlarged and reduced according to a conventional enlargement/reduction procedure.
Figure 16B:
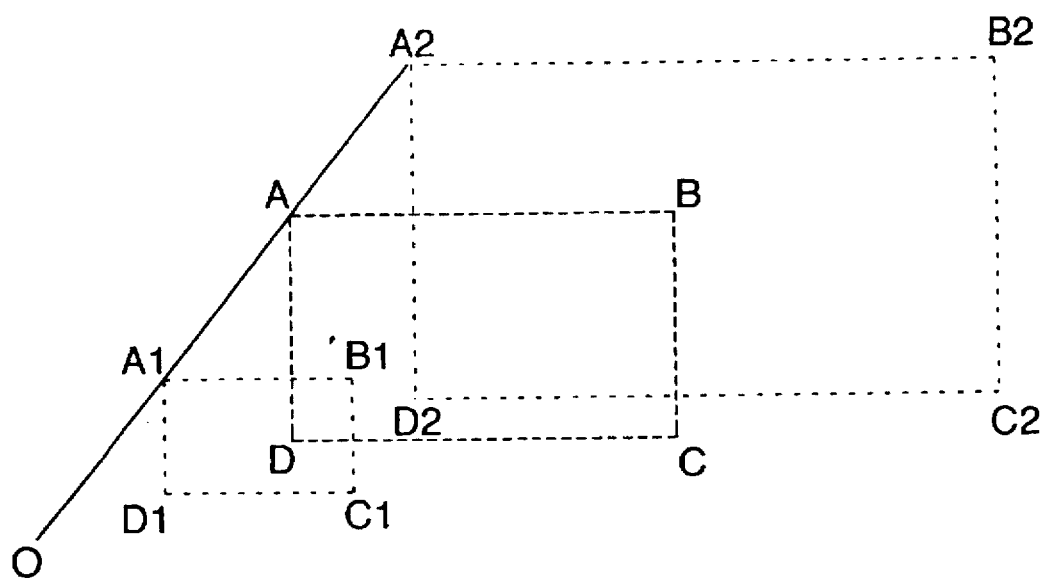
Figure 17:
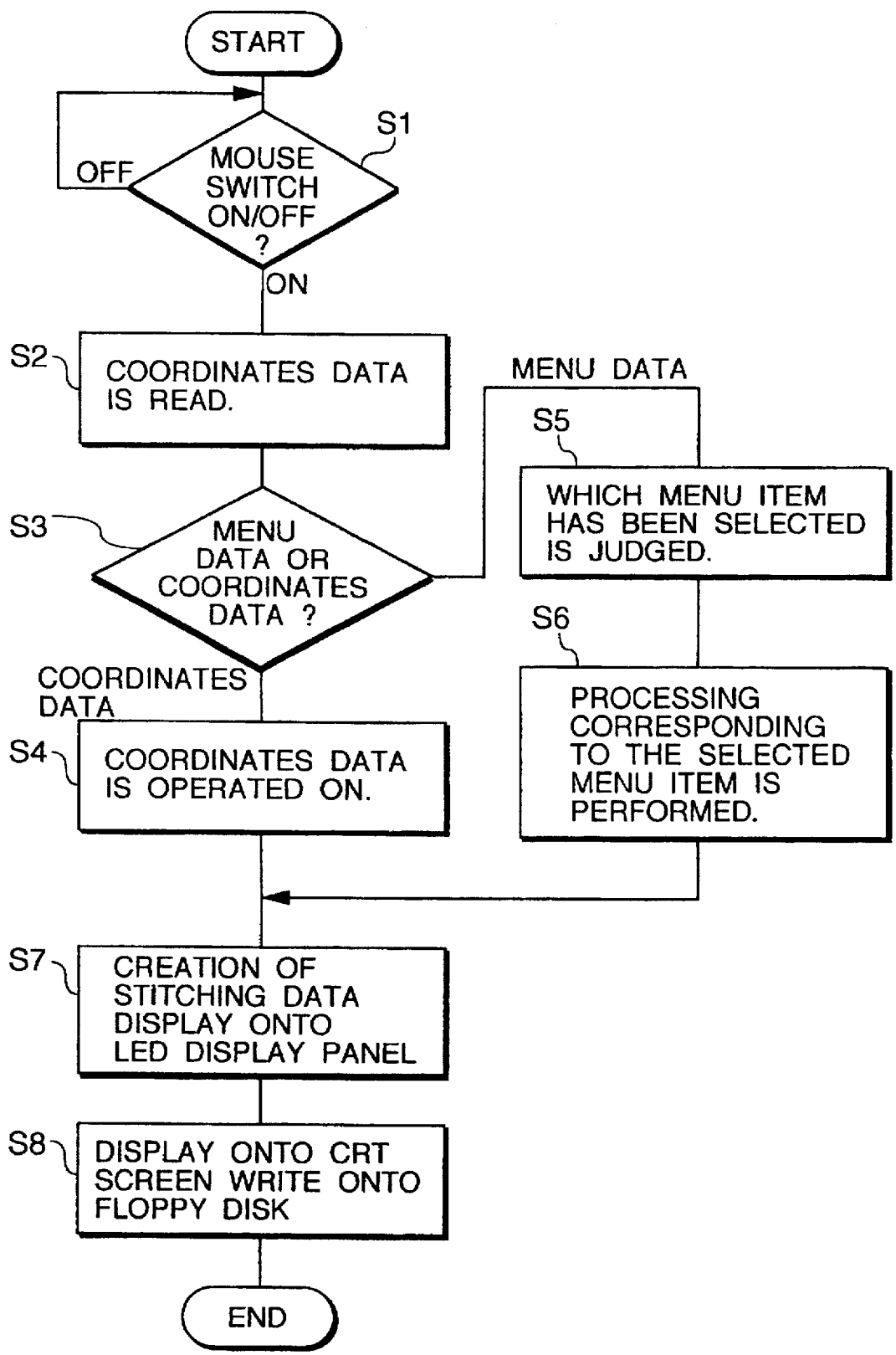
FIG. 17 is a flowchart illustrating a conventional enlargement/reduction procedure.

In an embodiment of the present invention, the menu section 11 illustrated in FIG. 14 includes a "ENL/RDC" key (not shown) for a new menu item. This "ENL/RDC" key is among the keys used to select one of enlargement/reduction types shown in FIGS. 1(a) to 1(f). Specifically, the numbers "1" to "6" are used to select one of the enlargement/reduction types. That is, the type shown in FIG. 1(a) corresponds to "1", FIG. 1(b) to "2", FIG. 1(c) to "3", FIG. 1(d) to "4", FIG. 1(e) to "5" and FIG. 1(f) to "6". In FIGS. 1(a) to 1(f), the continuous lines indicate non-stitching feed data, the broken lines denote seam data, and the dotted lines represent lines illustrating the reduction or enlargement.

In the process for enlarging or reducing stitching data, the stitching data is designated to be enlarged or reduced by entering the percentage of enlargement/reduction via the numeral keys. Then, the "SCALE" key is pressed, and any of the numeral keys "1" to "6" keys, representing the enlargement/reduction types shown in FIGS. 1(a)–1(f), is pressed. The "ENL/RDC" key is then pressed, and finally, the "START" key is pressed.

Figure 1A:
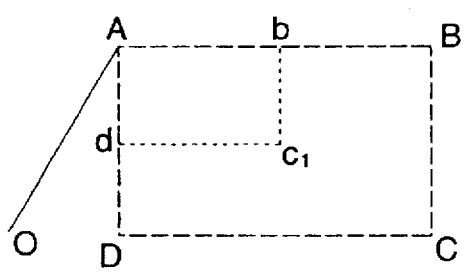
FIGS. 1(a)–1(f) are diagrams illustrating stitching patterns designated by various stitching data for a sewing machine according to an embodiment of the present invention.

A procedure for reducing a sewing data part corresponding to the sewing pattern of A-B-C-D-A, shown in FIG. 1(a) (hereinafter simply referred to as the "sewing data part"), to the sewing data part corresponding to the sewing pattern of A-b-c$_1$-d-A, relative to a sewing start position A, will now be described with reference to FIGS. 2, 3(a)–3(b), 14 and 15. It is to be noted that portion O-A of FIG. 1(a), which is the non-stitching feed data part corresponding to non-stitching feed in which the workpiece is positioned so that the needle is at the sewing start point A without sewing (hereinafter referred to as the "non-stitching feed data"), remains unchanged.

First, the reduction ratio is entered and the "SCALE" key is pressed. Then, the number "1" key, for example, specifying the reduction type shown in FIG. 1(a) is pressed, and the "ENL/RDC" key is then pressed. Finally, the "START" key is pressed. Data representing the reduction ratio and data indicating that the "1" key was pressed are stored into a sewing machine main storage RAM 24.

Since the number specifying the enlargement/reduction type that was entered is "1", the processing of reduction performed relative to the sewing start position, point A, is started (step T1). The pre-reduction stitching data stored in the main storage RAM 24 is identified by a data determining device sequentially, starting with the first stitch at the first address, depending on whether the control command is a non-stitching feed or sewing command (step T2). As a result of this check, the seam data having the first sewing command (Nth stitch), i.e., the sewing start position, is determined and the first address of the seam data is stored into the main storage RAM 24 (step T3).

Subsequently, the X-axis and Y-axis feed amounts of the seam data (Nth stitch) at the sewing start position are reduced by the CPU 14 on the basis of the address stored in the main storage RAM 24 according to the reduction ratio stored in the main storage RAM 24 (step T4). When the processing ends, the address of the next seam data is moved three bytes forward and the resultant address is stored in the main storage RAM 24 (step T5).

Then, it is determined whether the stitching data at the address stored in step T5 is the end of the stitching data (step T6). If it is not the end data, the X-axis and Y-axis feed amounts of the seam data at the address stored in the main storage RAM 24 are reduced by the CPU 14 according to the reduction ratio stored in the main storage RAM 24 (step T4). Step T5 is then executed again, and if the stitching data is the end of the stitching data, the reduction processing is terminated.

FIG. 3(b) shows new stitching data created by the processing described above. The non-stitching feed data remains unchanged and the seam data, that is, X-axis and Y-axis feed amounts for the Nth and subsequent stitches is reduced and stored into the main storage RAM 24.

Figure 1B:
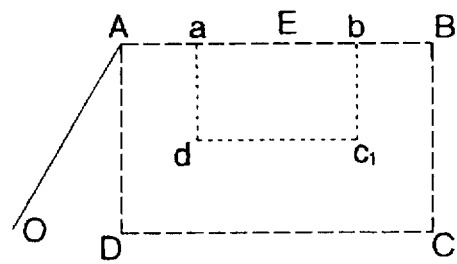

In another embodiment of the present invention, a reduction procedure will be described in which only the seam data part of the sewing data part of sewing pattern of O-A-B-C-D-A, shown in FIG. 1(b), is reduced relative to a specified stitch position E, and the reduced pattern of a-b-$c_1$-d-a is created. It is to be noted that the menu section 11 is designed as a seam data specifying device which is used to specify the position of specified seam data.

The operation of the present embodiment will be described with reference to FIGS. 4, 5(a)–5(b), 14 and 15. First, the reduction ratio is entered, and the "SCALE" key is pressed. Then, the "2" key, specifying the enlargement/reduction type, and the "ENL/RDC" key are pressed. Subsequently, the numeral keys of the menu section 11 are pressed to enter the numerals corresponding to the specified number of stitches in the seam data part. Finally, the "START" key is pressed.

Figure 4:
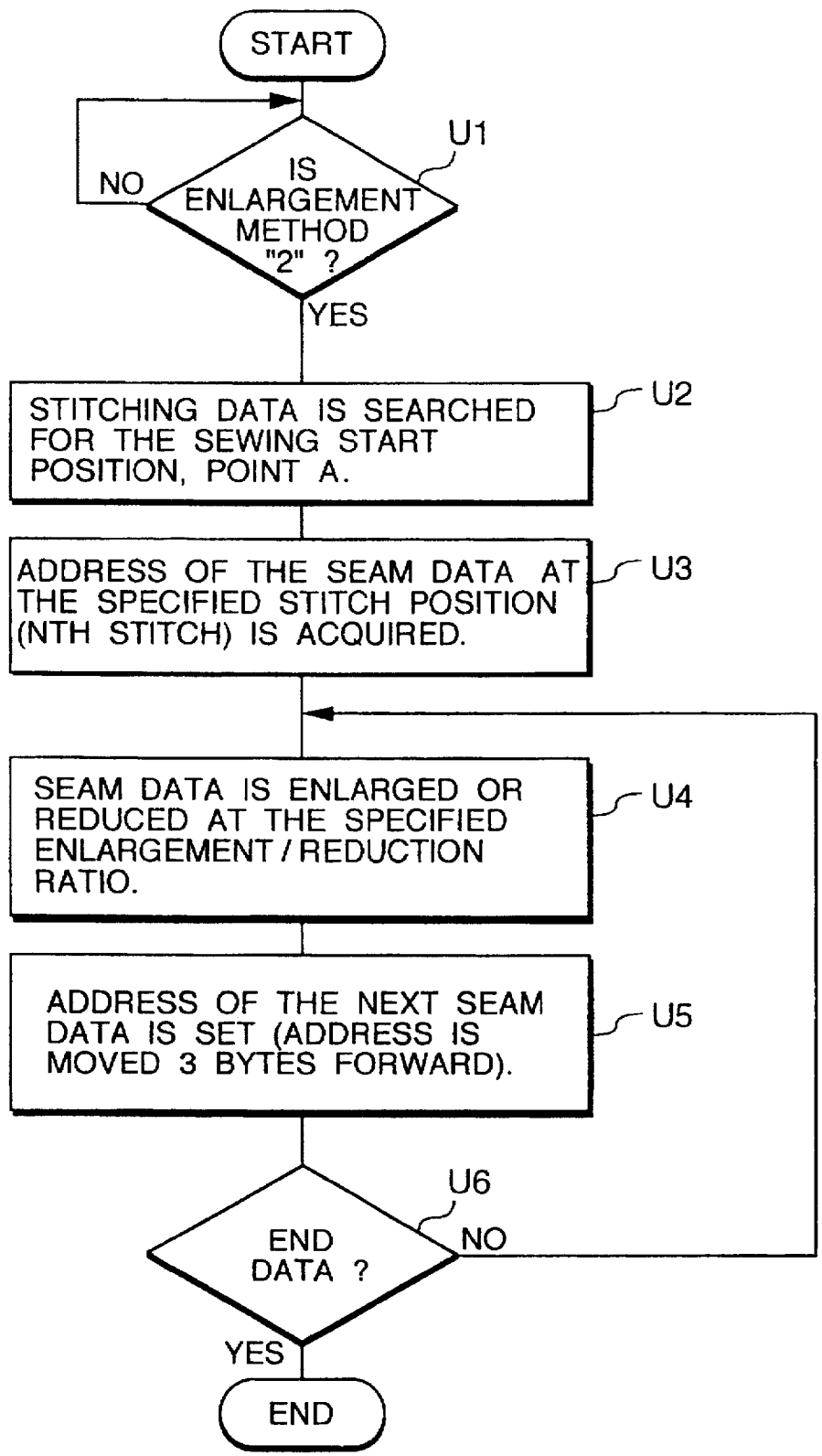
FIG. 4 is a flowchart illustrating an enlargement/reduction method for the data of the stitching pattern shown in FIG. 1(b)

As shown in FIG. 4, since the number specifying the enlargement/reduction type is "2", the processing of reduction performed relative to the specified stitch position is started (step U1). The pre-reduction stitching data stored in the main storage RAM 24, as shown in FIG. 5(a), is identified by the data determining device, starting with the first stitch at the first address, depending on whether the control command is a non-stitching feed or sewing command (step U2). The address of the sewing data is stored into the main storage RAM 24 (step U3).

Subsequently, the X-axis and Y-axis feed amounts are reduced by the CPU 14 relative to the seam data at the specified stitch position according to the preset reduction ratio (step U4). When the processing ends, the address of the next seam data is moved three bytes forward and the resultant address is stored into the main storage RAM 24 (step U5), and it is determined whether the set seam data is the end of the seam data (step U6).

If it is not the end of the seam data, steps U4 and U5 are repeated as described above. If said stitching data is the end of the seam data, the reduction processing is terminated.

FIG. 5(b) shows new stitching data created by the above operation. The X-axis and Y-axis feed amounts of the seam data for the Nth and subsequent stitches have been reduced and stored in the main storage RAM 24.

Figure 1C:
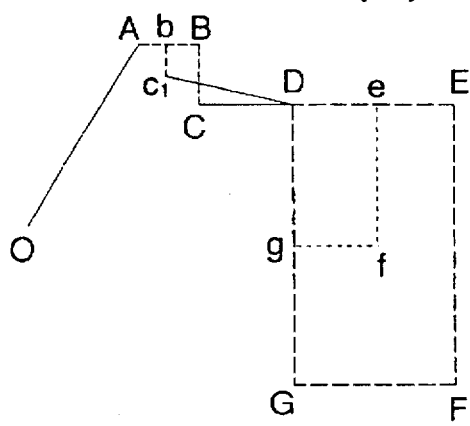

In another embodiment of the present invention, a reduction procedure will be described, wherein the sewing pattern of O-A-B-C-D-E-F-G-D, including the non-stitching feed part O-A, as shown in FIG. 1(c), is reduced without their sewing start positions, points A and D, being moved. Hence, the reduced pattern of O-A-b-$c_1$-D-e-f-g-D, which includes a new non-stitching feed data part of c-D, are created.

The operation of this embodiment will now be described with reference to FIGS. 6, 7(a)–7(b), 14 and 15.

First, the reduction ratio is entered, and the "SCALE" key is pressed. Then, the number "3" key, specifying the enlargement/reduction type, and the "ENL/RDC" key are pressed. Finally, the "START" key is pressed.

Figure 6:
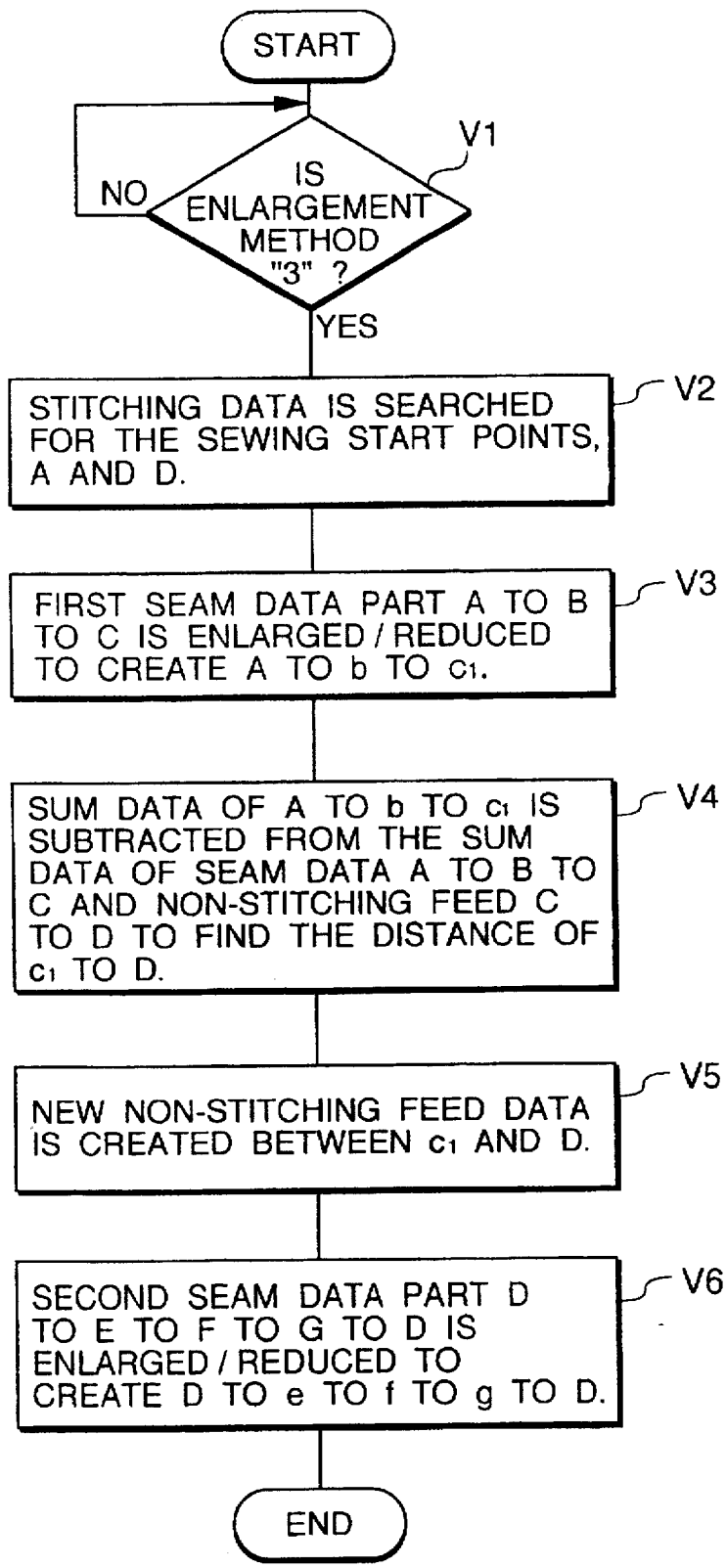
FIG. 6 is a flowchart illustrating an enlargement/reduction procedure for the data of the stitching pattern shown in FIG. 1(c)

Since the number specifying the enlargement/reduction type is "3" and the reduction ratio has been entered, as shown in the flowchart in FIG. 6, reduction processing in which the sewing start positions are not moved is started (step V1). The pre-reduction stitching data stored in the main storage RAM 24, representing the pattern shown in FIG. 1(c), is retrieved sequentially, starting with the first stitch at the first address. The sewing start positions, points A and D, are determined by the data determining device, and these data and addresses are stored into the main storage RAM 24 (step V2).

The stitching data up to the first sewing start position, point A, is stored unchanged into the main storage RAM 24. Then, the first seam data part A-B-C is reduced by the CPU 14 according to the pre-entered reduction ratio, and the seam data part A-b-$c_1$ is created and stored in the main storage RAM 24 (step V3). Subsequently, the total data value of A-b-$c_1$ is subtracted from the total data value of the seam data A-B-C and non-stitching feed data C-D, and a new non-stitching feed data part $c_1$-D is determined by the CPU 14 (step V4). The new non-stitching feed data $c_1$-D is created and stored in the main storage RAM 24 (step V5).

Subsequently, the second seam data part D-E-F-G-D is reduced by the CPU 14 according to the pre-entered reduction ratio, and the seam data part D-e-f-g-D is created and stored into the main storage RAM 24 (step V6). The processing is then terminated.

FIG. 7(a) and 7(b) show associated pattern data and the reduced stitching data newly stored in the main storage RAM 24 by the above operation.

Figure 1D:
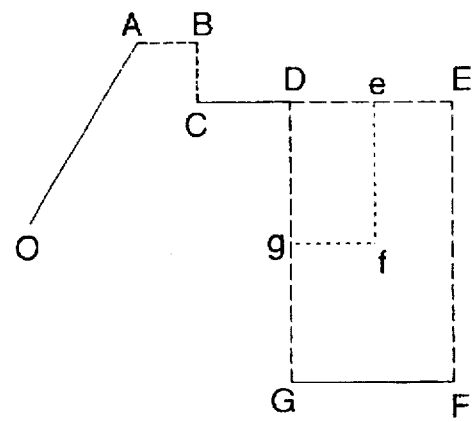

In another embodiment, the second sewing data part D-E-F-G-D of the stitching data, representing the pattern shown in FIG. 1(d), is reduced to a pattern of D-e-f-g-D without its sewing start position, point D, being moved. Here, the first sewing data part A-B-C and the non-stitching feed data part O-A remain unchanged.

The operation of this embodiment will be described with reference to FIGS. 8, 9(a)–9(b), 14 and 15. First, the numeral "2" is entered to specify the second seam data, and the reduction ratio is entered. The "SCALE" key is then pressed. The "4" key, specifying the reduction type, and the "ENL/RDC" key are subsequently pressed. Finally, the "START" key is pressed.

Figure 8:
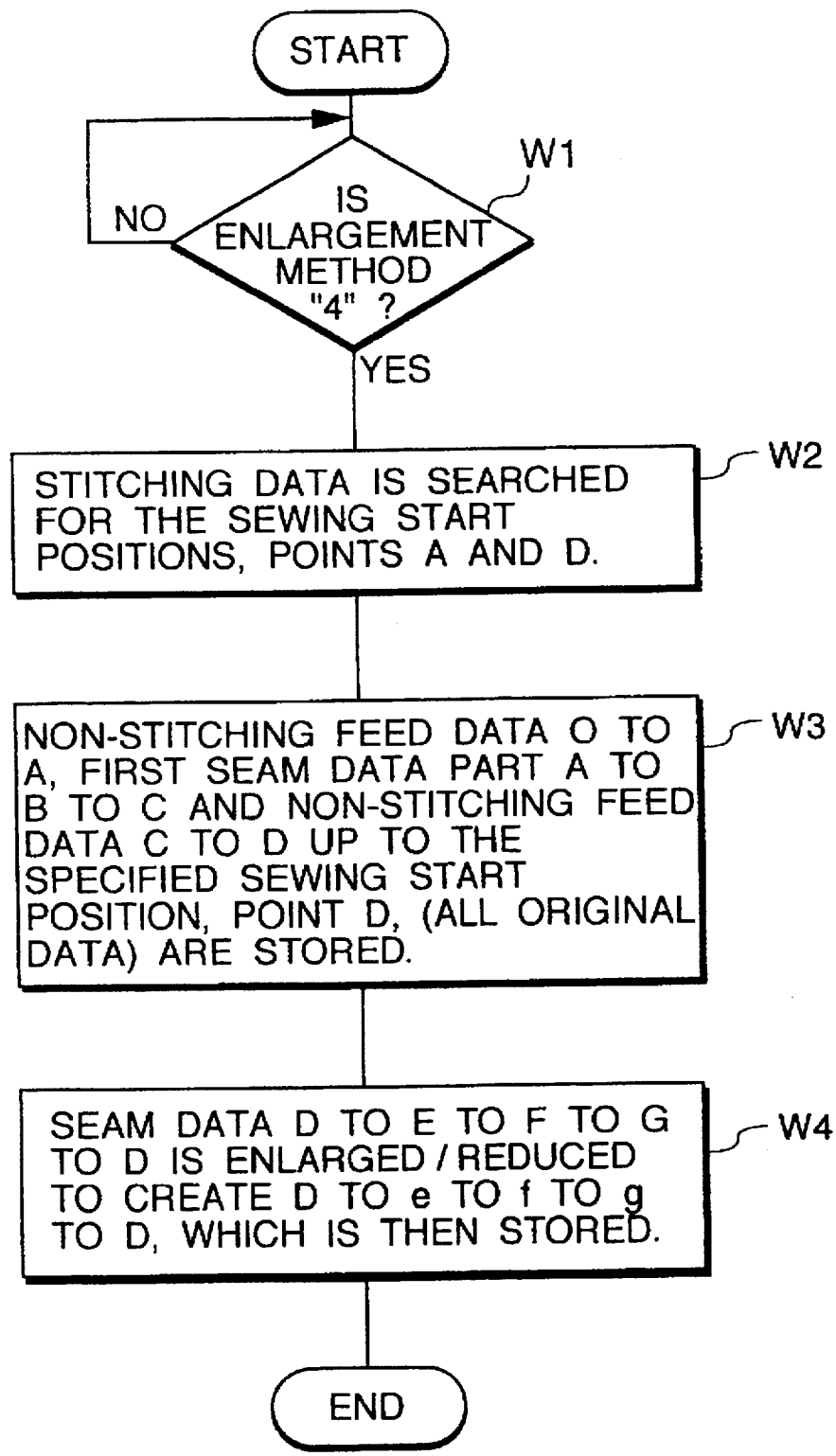
FIG. 8 is a flowchart illustrating an enlargement/reduction procedure for the data of the stitching pattern shown in FIG. 1(d)

Since the number specifying the enlargement/reduction type is "4", and the "2" key, specifying the second sewing data part, has been pressed, reduction processing, as shown in FIG. 8, in which the sewing start position D of the second seam data is not moved, is started (step W1). The pre-reduction stitching data stored in the main storage RAM 24, representing the pattern shown in FIG. 1(d), is retrieved sequentially, starting with the first stitch at the first address.

The sewing data and address of the sewing start position D of the specified second seam data are stored into the main storage RAM 24 (step W2), and the non-stitching feed data O-A, first seam data part A-B-C, and non-stitching feed data part C-D up to the specified sewing start position D, are stored into the main storage RAM 24 (step W3). Subsequently, the second seam data part D-E-F-G-D is reduced by the CPU 14 according to the pre-entered reduction ratio, and data representing the pattern D-e-f-g-D is created and stored into the main storage RAM 24 (step W4). The reduction processing is then terminated.

Figure 9A:
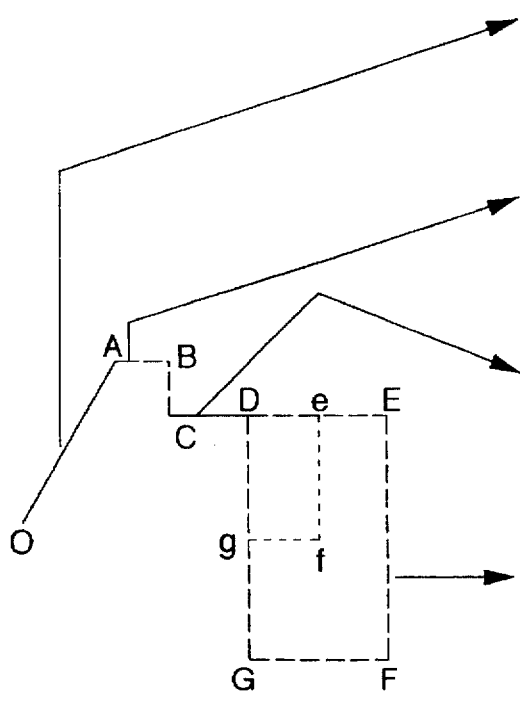
FIGS. 9(a) and 9(b), respectively, illustrate associated areas for the stitching pattern shown in FIG. 1(d), before and after the enlargement/reduction is performed.
Figure 9B:
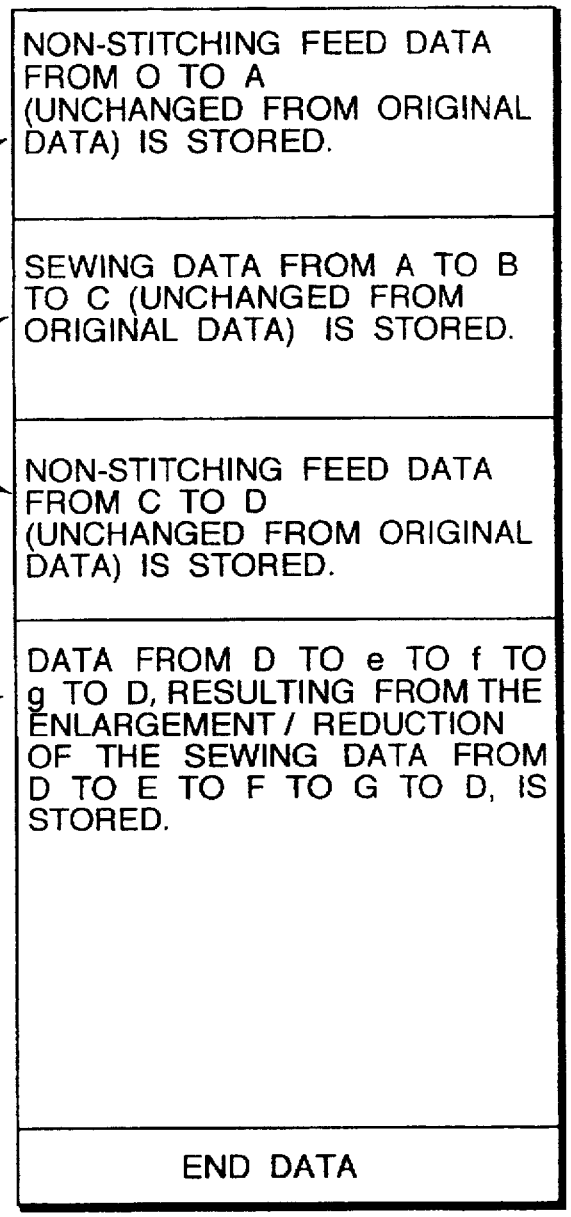

FIGS. 9(a) and 9(b) show associated pattern data and the reduced stitching data newly stored in the main storage RAM 24 by the above operation.

Figure 1E:
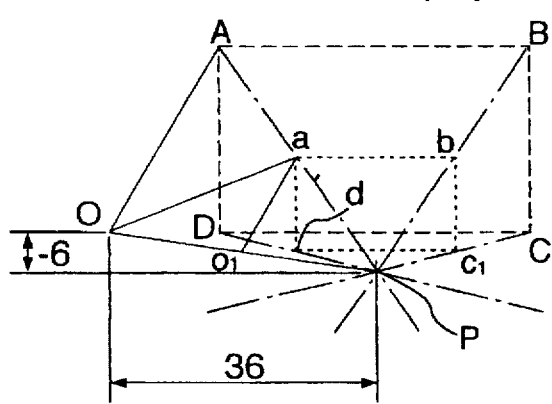

In a further embodiment of the present invention, a reduction procedure will be described, wherein only the seam data part of the pattern O-A-B-C-D-A, including the non-stitching feed part O-A, as shown in FIG. 1(e), is reduced to a pattern O-a-b-$c_1$-d-a, relative to a specified reduction reference point P, and a new non-stitching feed data part O-a is created.

The operation of this embodiment will be described with reference to FIGS. 10, 12(a)-12(b), 14 and 15.

First, the reduction ratio is entered, and the "SCALE" key is pressed. Then, the "5" key, specifying the enlargement/reduction type, and the "ENL/RDC" key are pressed. Subsequently, the numeral keys of the menu section 11 are pressed to enter the coordinate values of the reduction center point P, for example, "36, -6", for the seam data part A-B-C-D-A of the pattern to be reduced. Finally, the "START" key is pressed. It is to be noted that the coordinate values of the reduction center point P are represented by the X and Y coordinate values from the origin O and are to be entered in mm. Of course, the system can be designed so that the X and Y coordinate values can be any other suitable unit (e.g., inches, etc.), if desired.

Figure 10:
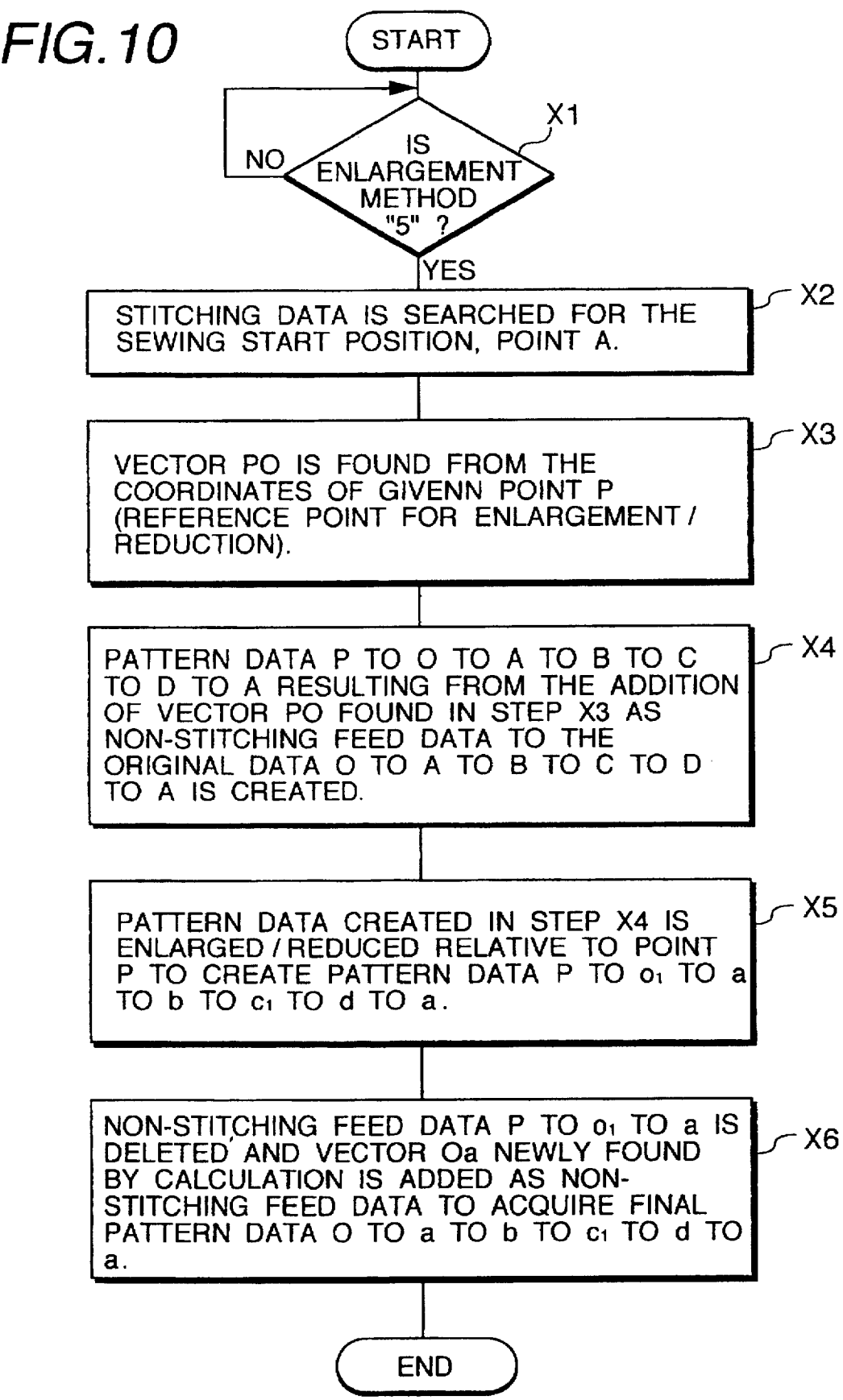
FIG. 10 is a flowchart illustrating an enlargement/reduction procedure for the data of the stitching pattern shown in FIG. 1(e)

Since the number specifying the enlargement/reduction type is "5", as shown in FIG. 10, the processing of reduction performed relative to the specified reduction center point P is started (step X1). The pre-reduction stitching data stored in the main storage RAM 24, representing the pattern shown in FIG. 1(e), is retrieved sequentially, starting with the first stitch at the first address. The data and address of the sewing start position of the seam data, point A, are stored in the main storage RAM 24 (step X2), and vector PO connecting the reference point P and origin O is found by the CPU 14 from the coordinates of the pre-entered center point P through the calculation (step X3). Here, vector PO indicates a directed segment from point P to point O.

Pattern data P-O-A-B-C-D-A resulting from the addition of vector PO found in step X3 as non-stitching feed data to the original data O-A-B-C-D-A is created (step X4). Then, the sewing data created in step X4 is reduced according to the pre-entered reduction ratio relative to point P to create pattern data P-o-a-b-$c_1$-d-a (step X5). The non-stitching feed data P-o-a is deleted, vector Oa found by arithmetic operation is created as non-stitching feed data, and final pattern data O-a-b-$c_1$-d-a is obtained and stored into the main storage RAM 24 (step X6). The reduction processing is then terminated.

The calculation of vector Oa described above will be described with reference to FIG. 1(e). Here, the enlargement/reduction ratio E has been entered from the enlargement/reduction setting device. Since vector OA has been entered from the coordinates input device and the reference point P entered from the center value specifying device, vector PO from origin O to reference point P has been operated on by the CPU 14 and stored in the main storage RAM 24. Namely, vector OA is found from the enlargement/reduction ratio E, vector OA and vector PO.

The following calculation expressions are stored in the main storage RAM 24 and operated on by the CPU 14:

Vector Oa=vector Oo+vector oa

Vector Oo=vector OP−vector oP

=vector OP−E×(vector OP)

=(vector OP)×(1−E)

Vector oa=E×(vector OA)

Vector Oa=(vector OP)×(1−E)+E×(vector OA)

FIG. 12(a) and 12(b) show associated pattern data and the reduced stitching data newly stored in the main storage RAM 24 by the above operation.

Figure 1F:
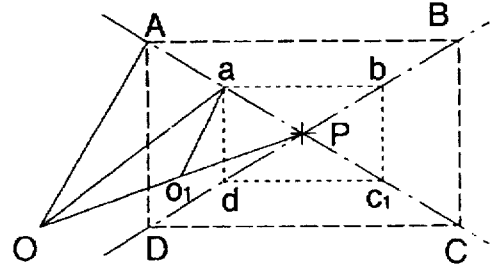
Figure 2:
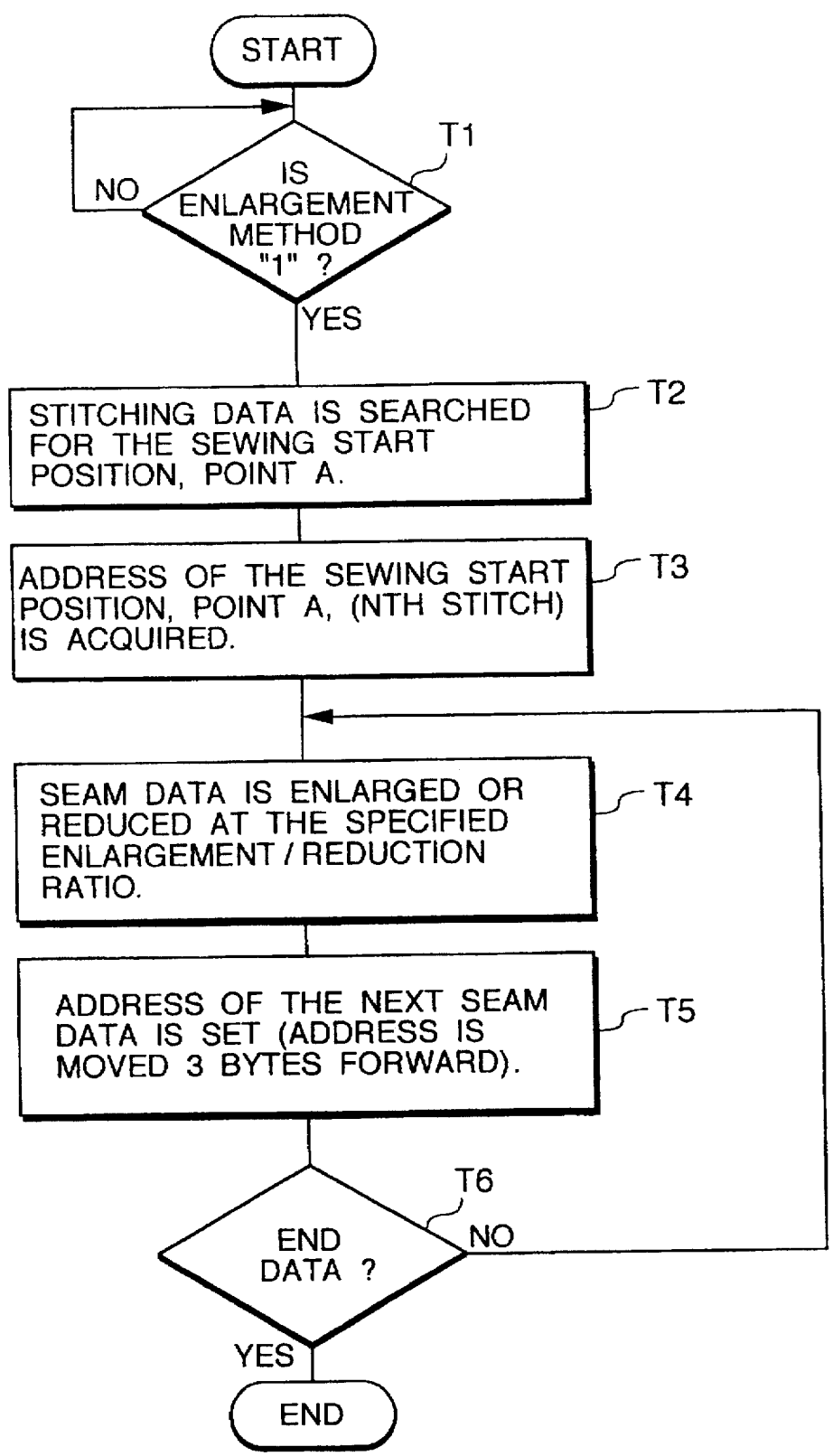
FIG. 2 is a flowchart illustrating an enlargement/reduction procedure for the stitching data shown in FIG. 1(a)

In a further embodiment, a reduction procedure will be described, wherein the pattern data O-A-B-C-D-A, including the non-stitching feed part O-A, as shown in FIG. 1(f), is reduced relative to P, the center of the seam data part A-B-C-D-A, and a new non-stitching feed data part O-a is created.

The operation of this embodiment will be described with reference to FIGS. 11, 12(c)-12(d), 14 and 15.

First, the reduction ratio is entered, and the "SCALE" key is pressed. Then, the "6" key, specifying the enlargement/reduction type, and the "ENL/RDC" key are pressed. Subsequently, the "START" key is pressed.

Figure 11:
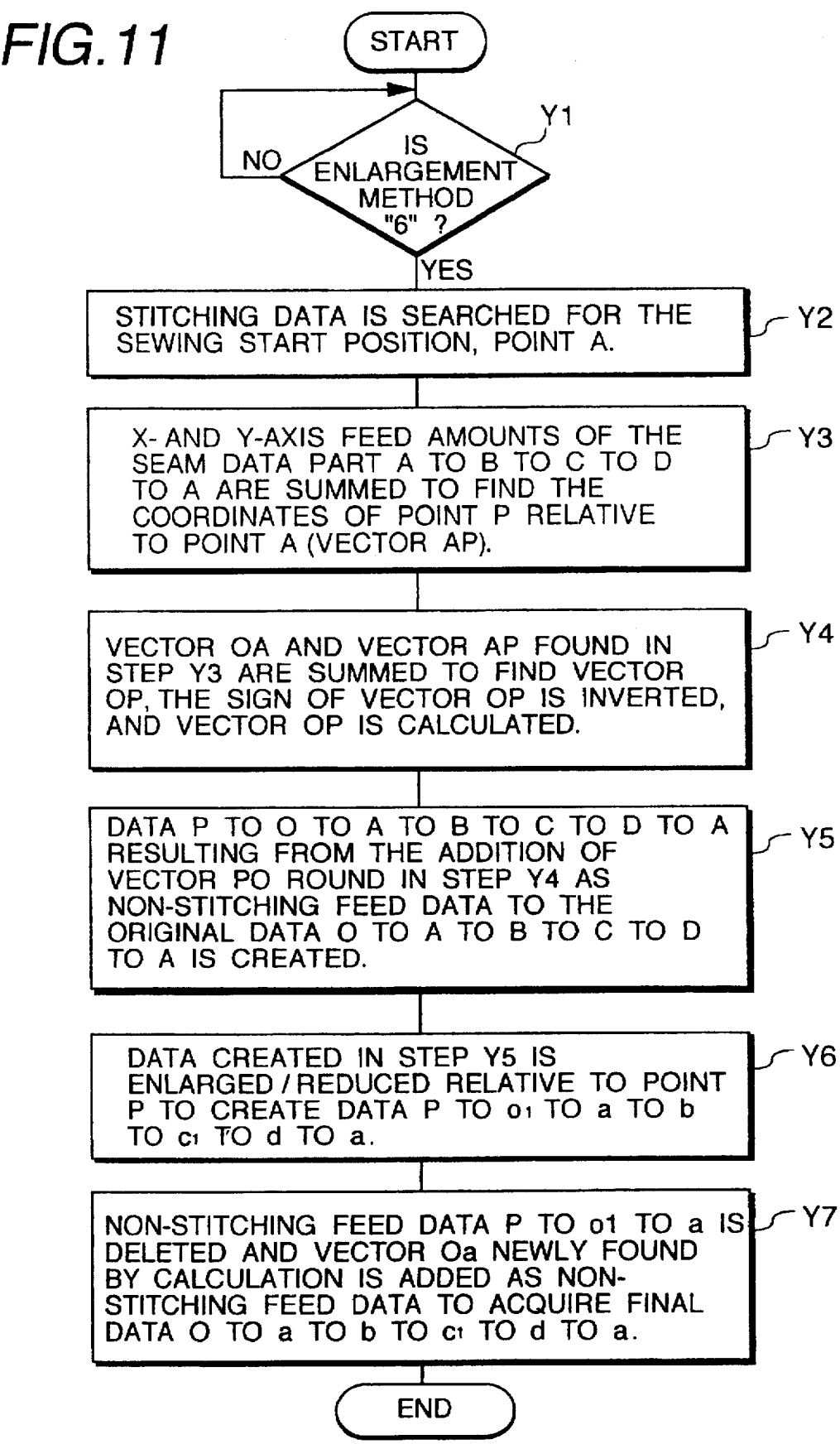
FIG. 11 is a flowchart illustrating a reduction procedure for the data of the stitching pattern shown in FIG. 1(f)
Figure 13:
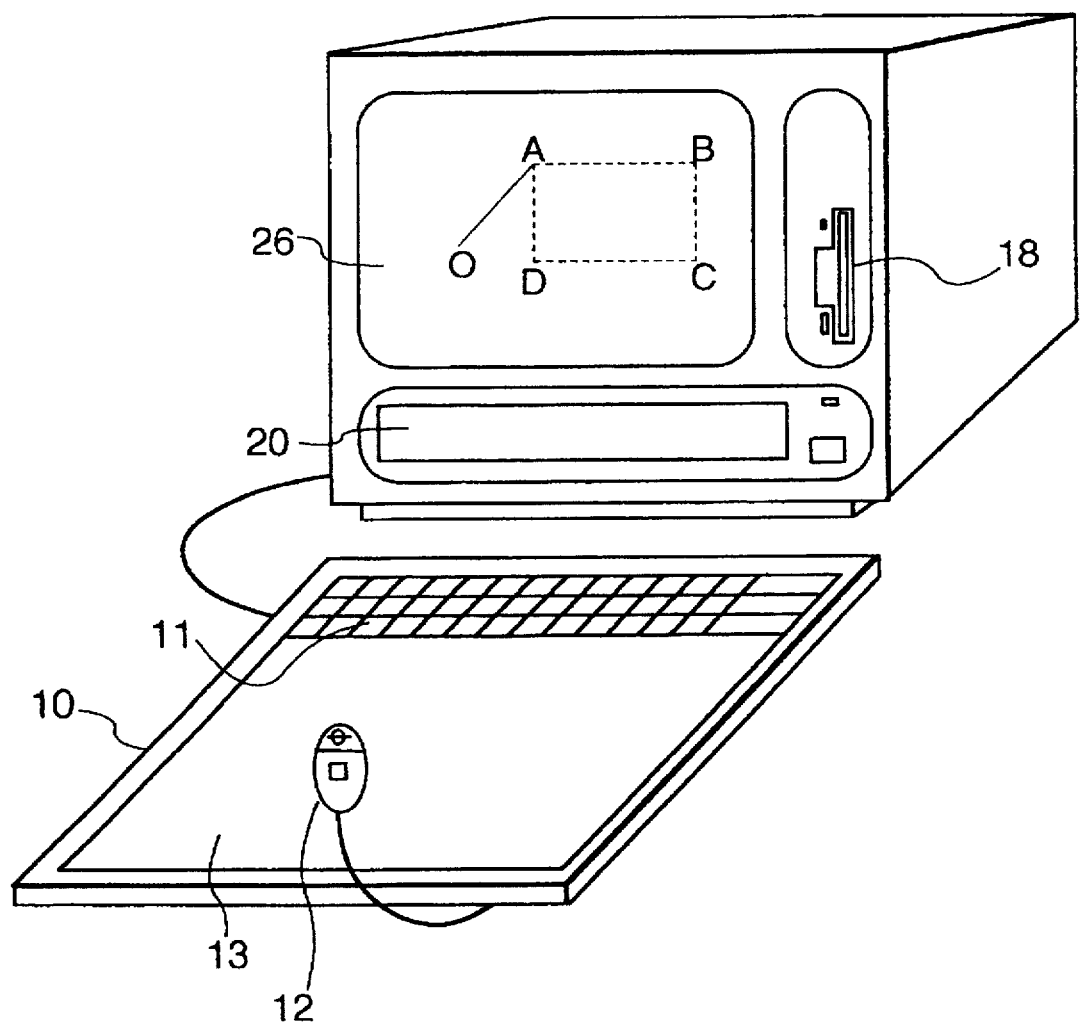
FIG. 13 is a perspective view illustrating a conventional apparatus for creating stitching data for sewing machines.

Since the number specifying the enlargement/reduction type is "6", as shown in FIG. 11, the processing of reduction performed relative to P, the center of the seam data part A-B-C-D-A, is started (step Y1). The pre-reduction stitching data stored in the main storage RAM 24, as shown in FIG. 1(f), is searched sequentially, starting with the first stitch at the first address, for the data and address of the sewing start position of the seam data, point A (step Y2).

The X-axis and Y-axis feed amounts of the seam data part A-B-C-D-A are summed, and the coordinates of point P (vector AP) relative to the sewing start position, point A, is determined by the CPU 14 (step Y3). Vector OA and vector AP determined in step Y3 are summed to find vector OP. The sign of vector OP is then inverted, and vector OP is operated on by the CPU 14 (step Y4).

Pattern data P-O-A-B-C-D-A, resulting from the addition of vector PO found in step Y4 as non-stitching feed data to the original pattern data O-A-B-C-D-A, is operated on and created by the CPU 14 (step Y5). Then, the pattern data created in step Y5 is reduced by the CPU 14 relative to point P according to the preset reduction ratio to create pattern data P-o-a-b-$c_1$-d-a (step Y6). The non-stitching feed data P-o-a is deleted, vector Oa newly found by computation is added as non-stitching feed data, and final pattern data O-a-b-$c_1$-d-a is obtained and stored in the main storage RAM 24 (step Y7). The reduction processing is then terminated.

The calculation of said vector Oa will be described with reference to FIG. 1(f). Here, the enlargement/reduction ratio E has been entered from the enlargement/reduction setting device. Vector OA has been entered from the coordinates input device, and the reference point P has been found by the CPU, serving as the center value arithmetic device, and vector PO from origin O to reference point P has been operated on by the CPU 14 and stored in the main storage RAM 24.

Namely, vector Oa is found from the enlargement/reduction ratio E, vector OA and vector PO as follows:

Vector Oa=vector Oo+vector oa

Vector Oo=vector OP−vector oP

=vector OP−E×(vector OP)

=(vector OP)×(1−E)

Vector oa=E×(vector OA)

Vector Oa=(vector OP)×(1−E)+E×(vector OA)

FIG. 12(c) and 12(d) show associated pattern data and the reduced stitching data newly stored in the main storage RAM 24 by the above operation.

It is to be noted that the reference point of the seam data part to be reduced may be specified with coordinates data as numerical values which begin at the start point, that is, the origin, of the stitching data or the sewing start position of the stitching data. This will increase the ability to reduce the pattern.

Also, for example, when the enlargement/reduction ratio specified is 100% and the coordinate data of the reference point is specified, the seam data part is moved by the amounts of the specified coordinate data, with its size unchanged.

Further, while only reductions have been described in detail in the above embodiments, it is needless to mention that the structures and operations of the embodiments are capable of enlarging the patters simply by entering an enlargement ratio via the numeral keys of the menu section 11.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for modifying stitching data representing a pattern that a sewing machine is to sew, said stitching data including non-stitching feed data, in accordance with which the sewing machine feeds a workpiece without sewing from an origin position to a sewing start position, and seam data including information defining feeding directions and feed amounts per stitch, in accordance with which the sewing machine sews said pattern, said apparatus comprising:

a data identifying device which identifies said seam data of said stitching data; and a seam data changing device which, in accordance with an enlargement/reduction ratio received from the sewing machine, converts said seam data identified by said data identifying device into new seam data representing a new pattern which is said pattern enlarged or reduced relative to said sewing start position, without modifying said non-stitching feed data.

2. An apparatus, for use with a sewing machine, for modifying stitching data representing a pattern that said sewing machine is to sew, said stitching data including non-stitching feed data, in accordance with which said sewing machine feeds a workpiece without sewing from an origin position to a sewing start position, and seam data including information defining feeding directions and feed amounts per stitch, in accordance with which said sewing machine sews, said apparatus comprising:

a data identifying device which identifies said seam data of said stitching data;

a seam data specifying device which specifies a portion of said seam data identified by said data identifying device; and a specified data changing device which converts said portion of said seam data specified by said seam data specifying device into a new portion of said seam data representing a portion of said pattern enlarged or reduced, without modifying said non-stitching feed data.

3. The apparatus as claimed in claim 1, further comprising a non-stitching feed data creating device which creates new non-stitching feed data, in accordance with which said sewing machine feeds said workpiece without sewing between first and second seam positions represented by portions of said new seam data.

4. The apparatus as claimed in claim 2, wherein said seam data includes first and second seam data portions representing first and second portions, respectively, of said pattern, wherein said stitching data includes second non-stitching feed data, in accordance with which said sewing machine feeds said workpiece without sewing from a position on said first portion of said pattern to a position on said second portion of said pattern, and said portion specified by said seam data specifying device is a portion of one of said first portion of said pattern and said second portion of said pattern.

5. The apparatus as claimed in claim 1, further comprising:

a center specifying device which specifies the center of said new pattern; and wherein said seam data changing device converts said seam data in accordance with said enlargement/reduction ratio and with reference to said center specified by said center specifying device.

6. The apparatus as claimed in claim 1, further comprising:

a center value arithmetic device which calculates a center of said new pattern relative to said sewing start position based on X-axis data and Y-axis data of said stitching data; and wherein said seam data changing device converts said seam data in accordance with said enlargement/reduction ratio and with reference to said center calculated by said center value arithmetic device.

7. The apparatus as claimed in claim 5, further comprising a non-stitching feed data creating device which creates new non-stitching feed data in accordance with which said sewing machine feeds said workpiece without sewing from said origin to said center.

8. The apparatus as claimed in claim 6, further comprising a non-stitching feed data creating device which creates new non-stitching feed data in accordance with which said sewing machine feeds said workpiece without sewing from said origin to said center.

9. A method for creating stitching data used by a sewing machine to sew a pattern represented thereby, said stitching data including non-stitching feed data, in accordance with which said sewing machine feeds a workpiece, without sewing, from an origin position to a sewing start position, and seam data including information defining feeding directions and feed amounts per stitch, in accordance with which the sewing machine sews said pattern, said method comprising the steps of:

identifying said seam data of said stitching data; and changing, in accordance with an enlargement/reduction ratio, said seam data identified in said identifying step into new seam data representing a new pattern which is said pattern enlarged or reduced relative to said sewing start position, without changing said non-stitching feed data.

10. A method for creating stitching data used by a sewing machine to sew a pattern represented thereby, said stitching data including non-stitching feed data, in accordance with which said sewing machine feeds a workpiece without sewing from an origin position to a sewing start position, and seam data including information defining feeding directions and feed amounts per stitch, in accordance with which the sewing machine sews said pattern, said method comprising the steps of:

identifying said seam data of said stitching data;

specifying a portion of said seam data identified in said identifying step; and converting said portion of said seam data into a new portion of said seam data representing a portion of said pattern enlarged or reduced, without modifying said non-stitching feed data.

11. The method as claimed in claim 9, further comprising the step of creating new non-stitching feed data, in accordance with which said sewing machine feed said workpiece without sewing between first and second seam positions represented by portions of said new seam data.

12. The method as claimed in claim 10, wherein said seam data includes first and second seam data portions representing first and second portions, respectively, of said pattern, said stitching data includes second non-stitching feed data, in accordance with which said sewing machine feeds said workpiece without sewing from a position on said first portion of said pattern to a position on said second portion of said pattern, and said portion specified in said specifying step is a portion of one of said first portion of said pattern and said second portion of said pattern.

13. The method as claimed in claim 9, further comprising the steps of:

specifying the center of said new pattern; and wherein said changing step converts said seam data in accordance with said enlargement/reduction ratio and with reference to said center specified in said center specifying step.

14. The method as claimed in claim 9, further comprising:

calculating a center of said new pattern relative to said sewing start position based on X-axis data and Y-axis data of said stitching data; and wherein said changing step converts said seam data in accordance with said enlargement/reduction ratio and with reference to said center calculated in said calculating step.

15. The method as claimed in claim 13, further comprising the step of creating new non-stitching feed data in accordance with which said sewing machine feeds said workpiece without sewing from said origin to said center.

16. The method as claimed in claim 14, further comprising the step of creating new non-stitching feed data in accordance with which said sewing machine feeds said workpiece without sewing from said origin to said center.

* * * * *